(12) United States Patent
Furuhata et al.

(10) Patent No.: US 6,643,246 B2
(45) Date of Patent: Nov. 4, 2003

(54) OPTICAL PICKUP APPARATUS

(75) Inventors: Hitoshi Furuhata, Tokorozawa (JP); Tomotaka Nishimura, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 56 days.

(21) Appl. No.: 10/091,355

(22) Filed: Mar. 6, 2002

(65) Prior Publication Data

US 2002/0131348 A1 Sep. 19, 2002

(30) Foreign Application Priority Data

Mar. 7, 2001 (JP) .................................. 2001-063621

(51) Int. Cl.[7] .................................................. G11B 7/00
(52) U.S. Cl. .............................. 369/112.05; 369/44.29; 369/44.37
(58) Field of Search ........................... 369/44.27, 44.29, 369/44.35, 44.37, 44.41, 53.37, 112.03, 112.04, 112.05, 112.11, 121, 124.03, 44.26

(56) References Cited

U.S. PATENT DOCUMENTS 6,084,843 A * 7/2000 Abe et al. ............... 369/112.07
6,366,543 B2 * 4/2002 Uemura et al. .......... 369/44.29
6,567,355 B2 * 5/2003 Izumi et al. ............. 369/44.41

* cited by examiner

Primary Examiner—Paul W. Huber
(74) Attorney, Agent, or Firm—Sughrue Mion, PLLC (57) ABSTRACT

An optical pickup apparatus which, assuming that a distance from a first light source to a first grating is a, a distance from a second light source to a second grating is b, a first predetermined grating pitch is I, a second predetermined grating pitch is J, the wavelength of a first laser beam is $\lambda 1$, and the wavelength of a second laser beam is $\lambda 2$, satisfies $\lambda 1/\lambda 2 > (I \cdot b)/(J \cdot a)$, and which is capable of preventing a drop in the level of a tracking error signal resulting from decentering of an optical recording medium, even in the case of using either of optical recording media of different recording densities.

5 Claims, 8 Drawing Sheets

OPTICAL PICKUP APPARATUS

BACKGROUND OF THE INVENTION

1. Field of the Invention

The present invention relates to an optical pickup apparatus that uses a plurality of light sources that emit laser beams having mutually different wavelengths to optically read information on optical recording media having mutually different recording densities.

2. Description of the Related Art

Optical pickup apparatuses are already known that are capable of reading information from optical discs, namely from both CD-type optical discs including CDs, CD-ROMs and information recorded CD-Rs, and DVD-type playback-only optical discs including DVDs and DVD-ROMs. Optical pickup apparatuses of this kind comprise two light sources that emit laser beams of mutually different wavelengths on account of the fact that the recording densities of CD-type optical discs and DVD-type optical discs differ, and that the reflectance of CD-R discs and DVD discs is respectively different. One of these two light sources is selected in accordance with whether a disc to be read is either one of a CD-type disc and a DVD-type disc.

An objective lens and a photodetector are both used commonly, as a single unit, for a CD-type disc or a DVD-type disc, and, consequently, an optical path combination prism is provided for passing beams emitted by the two light sources on the same optical path such that each of the beams is on the same optical path from a midway point toward the disc.

An optical pickup apparatus of this kind typically performs a focusing servo with the astigmatism method and a tracking servo with the three beam method, which constitute cost-effective and simple methods. The astigmatism method is applied to beams to thereby detect a focusing error, a cylindrical lens being disposed downstream from the optical path combination prism (facing away from the optical path combination prism and toward the disc). Further, the three-beam method necessitates two sub-beams in addition to a main beam used for information reading, these two sub-beams (±1 order diffracted lights) being generated by diffracting a laser beam emitted by a light source by means of a grating disposed downstream from the optical path combination prism.

Figure 1:
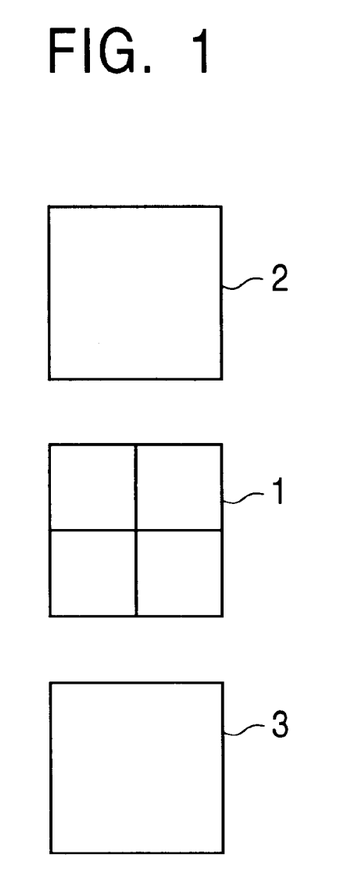
FIG. 1 shows light-receiving surfaces of a conventional photodetector.

As shown in FIG. 1, a photodetector, which is used in such an optical pickup apparatus, comprises: a four-section light-receiving portion 1, which is used to receive a main beam, and sub-beam light-receiving portions 2 and 3, which are disposed such that the four-section light-receiving portion 1 lies therebetween. The astigmatism method is performed by receiving a main beam, which has been astigmatized by means of a cylindrical lens, by means of the four-section light-receiving portion 1, performing a calculation involving the addition and multiplication of the four amounts of light received, and then obtaining a focusing error signal. Further, the three-beam method is performed by receiving two sub-beams, which have been produced by a grating, in sub-beam light-receiving portions 2 and 3, and then obtaining a tracking error signal from the difference between amounts of light by received sub-beams.

Also, in the photodetector shown in FIG. 1, since the main beam is received by the four-section light-receiving portion 1, it is possible to perform a tracking servo with the phase difference method. Further, a tracking servo can be properly performed such that the three-beam method is used for CD-type discs, and the phase difference method is used for DVD-type discs.

On the other hand, among DVD-type discs, DVD-RAMs are known that are capable of rewriting and recording information. DVD-RAM discs are land and groove type optical discs in which the pitch of the guide grooves themselves is larger than that of conventional optical discs, in a comparison of optical spots, in order that information can be recorded in the guide grooves (grooves) and also the guide groove intervals (lands), of substantially equal width. For this reason, when a focusing servo is performed with the astigmatism method, there is a problem that a noise component of a focusing error signal, which is generated when an optical spot crosses a track as a result of decentering of an optical disc, is larger than the noise component of a conventional disc. Also, due to the fact that land and groove type discs such as DVD-RAMs have land portions and groove portions of equal width with a view to equalizing the respective amount of light reflected from the land portions and groove portions, even if a tracking servo is to be performed with the three-beam method, since there is barely any change to the amount of light of the two sub-beams, even off-track, there is a problem that it is therefore difficult to pick up a tracking error signal.

Therefore, for a focusing servo of a DVD-RAM disc, a canceling system is recommended that uses a photoreception signal for the two sub-beams to cancel the noise component, resulting from track crossing, of the focusing error signal obtained by using the astigmatism method, and for a tracking servo of a DVD-RAM disc, the push-pull method or the differential push-pull method is recommended.

The above-described conventional optical pickup apparatus is capable of playback of both CD-type optical discs including CDs, CD-ROMs, and information-recorded CD-Rs, and of DVD-type playback-only optical discs including DVDs and DVD-ROMs. Further, it is required that information-recorded DVD-RAM discs can be played in the conventional optical pickup apparatus. However, as described above, since the focusing servo method and tracking servo method for DVD-RAMs are different from those of other DVDs, it is difficult to easily implement an optical pickup apparatus for playing either of CD-type optical discs and DVD-type optical discs including information-recorded DVD-RAM discs.

SUMMARY OF THE INVENTION

An object of the present invention is to provide an optical pickup apparatus that is correctly capable of playback of either of CD-type optical discs and DVD-type optical discs including DVD-RAM discs.

According to the present invention, there is provided an optical pickup apparatus comprising: a first light source for emitting a first laser beam having a first wavelength; a second light source for emitting a second laser beam having a second wavelength that is longer than the first wavelength of the first laser beam; a first grating having a diffraction grating formed with a first predetermined grating pitch, for passing through the first laser beam as a main-beam, and for outputting two sub-beams composed from diffracted lights of the first laser beam; a second grating having a diffraction grating formed with a second predetermined grating pitch different from the first predetermined grating pitch, for passing through the second laser beam as a main-beam, and for outputting two sub-beams composed from diffracted lights of the second laser beam; and an optical system for guiding the main beam and the two sub-beams to a recording surface of a recording medium, and for guiding the main beam and the sub-beams reflected at the recording surface of the recording medium to a photodetector to form respective spots corresponding to the main-beam and the two sub-beams reflected, on light-receiving surfaces of the photodetector, wherein assuming that a distance from the first light source to the first grating is given by a, a distance from the second light source to the second grating is given by b, the first predetermined grating pitch is given by I, the second predetermined grating pitch is given by J, the wavelength of the first laser beam is given by $\lambda 1$, and the wavelength of the second laser beam is given by $\lambda 2$, $$\lambda 1/\lambda 2 > (I \cdot b)/(J \cdot a)$$

is satisfied.

DESCRIPTION OF THE PREFERRED EMBODIMENTS

Embodiments of the present invention will be described in detail hereinbelow by referring to the drawings.

Figure 2:
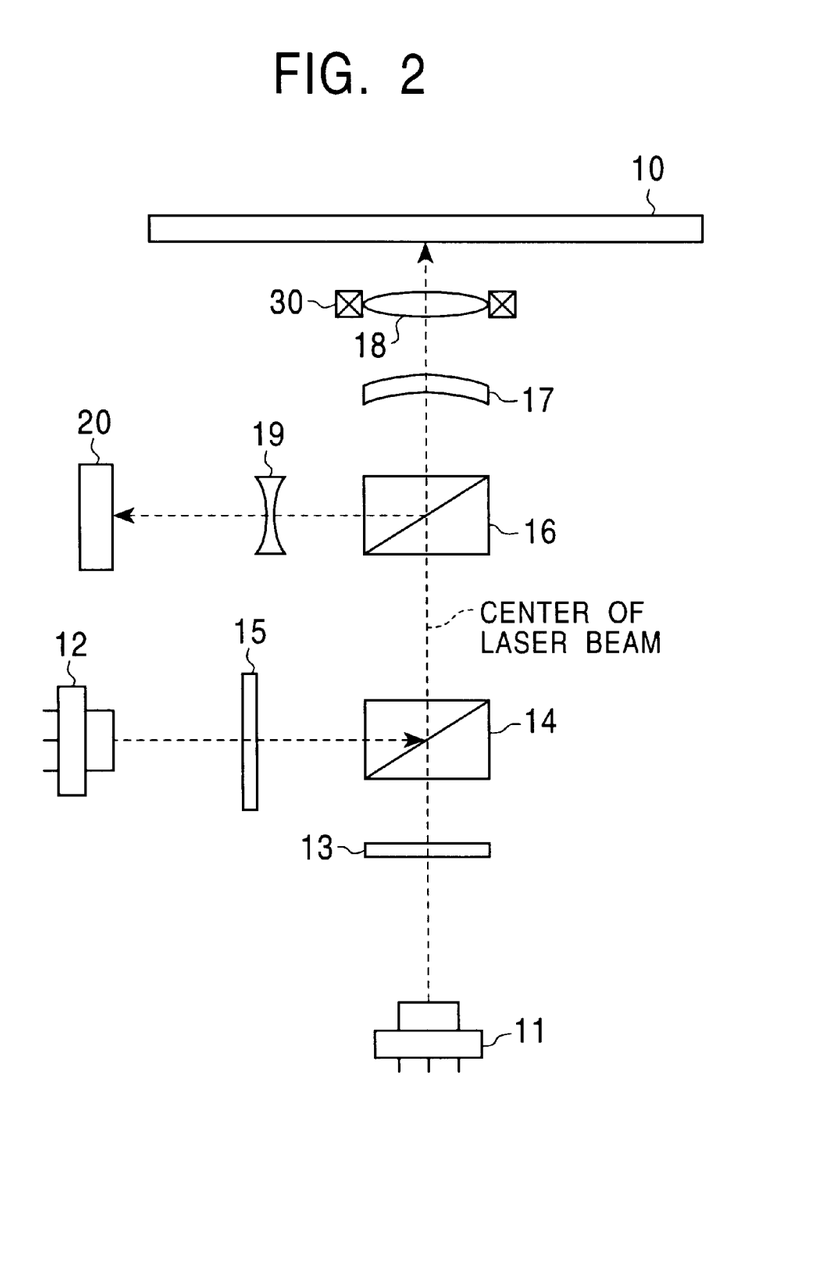
FIG. 2 shows the constitution of an optical system of an optical pickup apparatus according to the present invention.

FIG. 2 shows an optical system of an optical pickup apparatus according to the present invention as used in a disc player. This optical pickup apparatus is equipped with two semiconductor laser elements 11 and 12. The first semiconductor laser element 11 emits a first laser beam with a 650 nm wavelength for a DVD. The second semiconductor laser element 12 emits a second laser beam with a 780 nm wavelength for a CD. The semiconductor laser elements 11 and 12 are driven selectively by a drive circuit (not shown).

A first laser beam emitted from the semiconductor laser element 11 reaches an optical path combination prism 14 via a first grating 13. The first grating 13 is provided for the division of the first laser beam into a plurality of luminous fluxes (0 order light, ±1 order lights). The 0 order light is a main beam constituted by an incident first laser beam being transmitted as-is, and this main beam is used by a focusing servo and for the production of a read signal. The ±1 order lights are sub-beams produced by the diffraction of the first laser beam, and are used as well as 0 order light for a tracking servo according to the differential push-pull method. The optical path combination prism 14 causes the first laser beam to be transmitted as-is in the direction of travel thereof.

A second laser beam emitted from the semiconductor laser element 12 reaches the optical path combination prism 14 via the second grating 15. The second grating 15 is provided for the division of the second laser beam into a plurality of luminous fluxes (0 order light, ±1 order lights). Similarly to the first laser beam, also in the case of the second laser beam, the 0 order light is a main beam constituted by an incident second laser beam being transmitted as-is, and this main beam is used by a focusing servo and for the production of a read signal. The ±1 order lights are sub-beams produced by the diffraction of the second laser beam, and are used for a tracking servo according to the three-beam method. The optical path combination prism 14 causes reflection at an angle of substantially 90 degrees with respect to the incidence of the second laser beam. The direction of this reflected laser beam is the same as the direction of travel of the first laser beam described above, and constitutes the direction of the optical disc 10 (recording medium).

Figure 3:
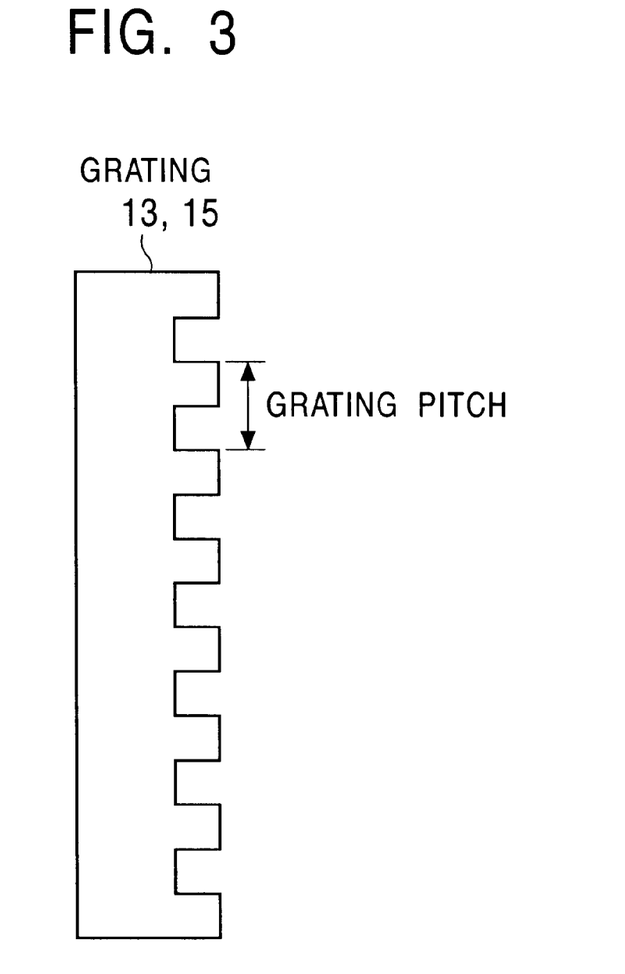
FIG. 3 shows a cross-section of a grating.

The cross-section of the first grating 13 and the second grating 15 is a shape formed by the repetition of recesses of a predetermined grating pitch, as shown in FIG. 3. The surface formed with the recesses is the diffraction grating surface and the side opposite this grating surface is a planar surface. The first grating 13 and the second grating 15 are arranged such that a laser beam enters from the respective planar surface side thereof and exits at the grating surface thereof. The grating pitch is different for the first grating 13 and the second grating 15.

A beam splitter 16, a collimator lens 17 and an objective lens 18 are arranged between the optical path combination prism 14 and the optical disc 10. The beam splitter 16 allows the laser beam from the optical path combination prism 14 to pass as-is through the beam splitter 16 in the direction of the optical disc 10.

The collimator lens 17 converts the laser beam from the beam splitter 16 into planar light before supplying same to the objective lens 18. The objective lens 18 is a bifocal lens and causes convergence of the planar-light laser beam on the recording surface of the disc 10. The laser beam reflected at the recording surface of the disc 10 is converted to a convergent laser beam by the objective lens 18 and then the collimator lens 17, whereupon this convergent laser beam is reflected by the beam splitter 16. The beam splitter 16 causes reflection at an angle of substantially 90 degrees with respect to the incidence of the reflected laser beam, and, disposed in sequential order in this reflection direction are a cylindrical lens 19 and a photodetector 20. The cylindrical lens 19 is an astigmatism generating element for producing astigmatism and is disposed oriented, to permit convergence of a beam, in a direction inclined by 45 degrees with respect to the track direction.

The optical pickup apparatus further comprises an actuator 30 composed from a focussing section that causes displacement of the objective lens 18 in an optic axis direction and composed from a tracking section that causes displacement of the objective lens 18 in a disc radius direction perpendicular to the optic axis.

Figure 4:
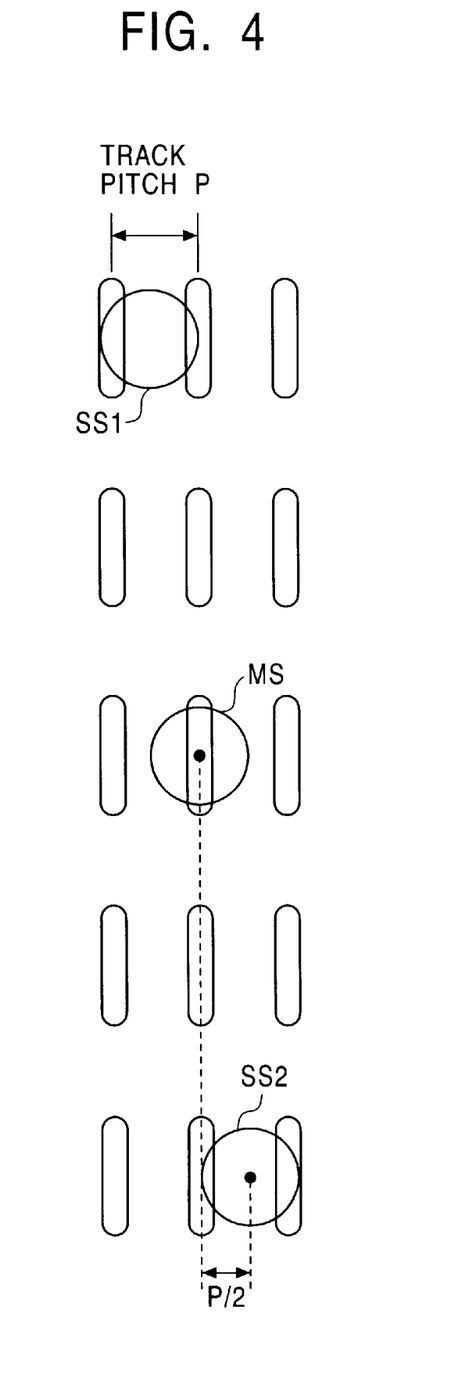
FIG. 4 shows beam spots formed on a DVD-type disc.

As a result of the emission of a first laser beam by means of the pickup apparatus, spots MS, Ss1 and Ss2 resulting from the main beam (0 order light) and the sub-beams (±1 order lights) are formed as shown in FIG. 4 on the disc 10 (a DVD, for example). The spots Ss1 and Ss2 of the two sub-beams are formed in positions displaced by half of track pitch P in the disc radius direction, with respect to the main beam spot MS. This is to permit the adoption of the differential push-pull method as described above in tracking error detection.

On the other hand, also as a result of the emission of a second laser beam, spots MS, Ss1 and Ss2 resulting from the main beam (0 order light) and the sub-beams (±1 order lights) are formed on the disc 10 (a CD, for example), although this is not shown in the figure. The spots Ss1 and Ss2 of the two sub-beams are formed in positions displaced by a quarter of track pitch P in the disc radius direction, with respect to the main beam spot MS. This is to permit the adoption of the three beam method as described above in tracking error detection.

Figure 5:
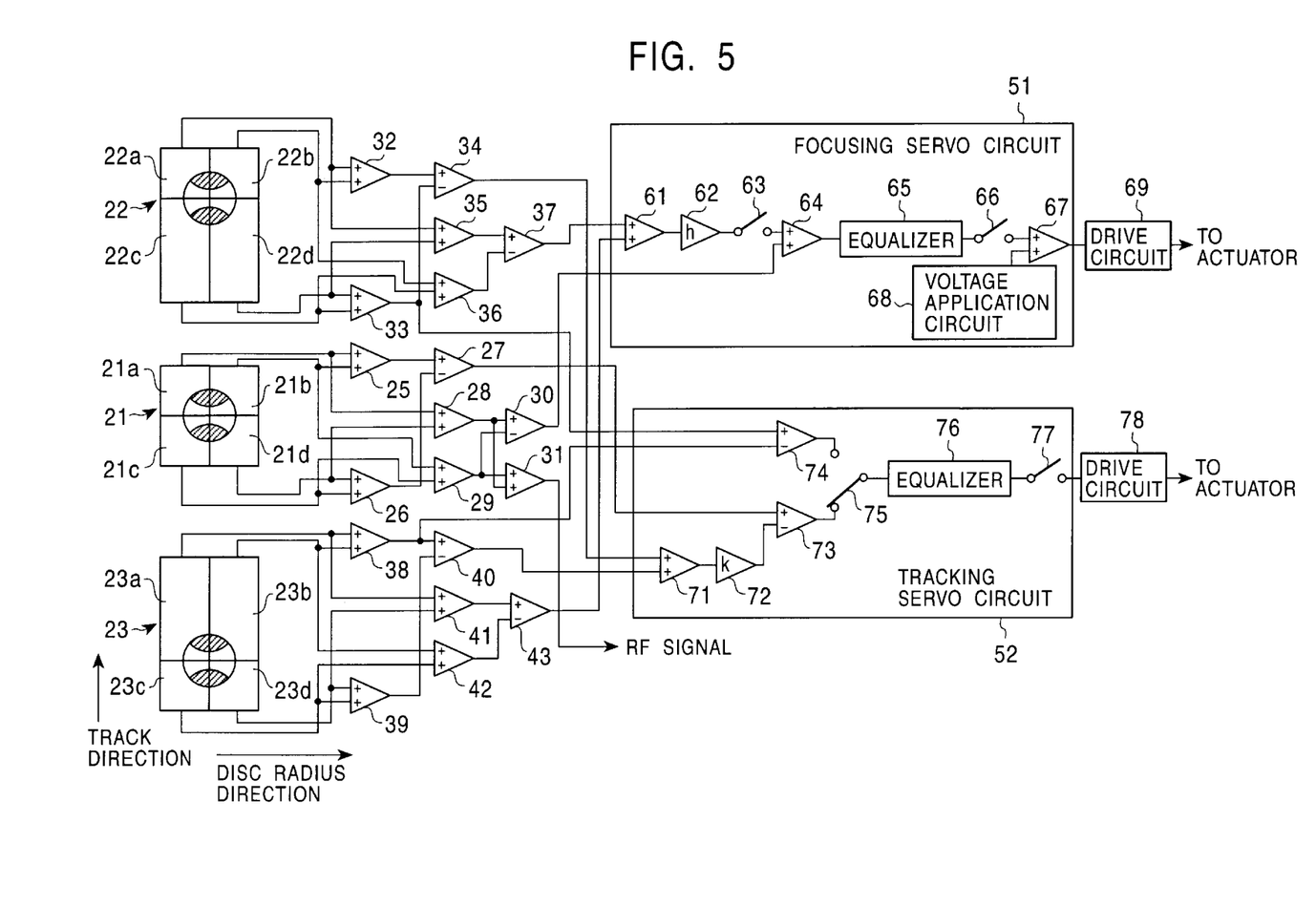
FIG. 5 shows the constitution of an electrical system of the optical pickup apparatus of FIG. 2.

As shown in FIG. 5, the photodetector 20 comprises a light-receiving portion 21, which is used to receive a main beam, and light-receiving portions 22 and 23 which are used to receive the sub-beams and which are disposed such that the light-receiving portion 21 lies therebetween. The light-receiving portions 21, 22 and 23 each have a four-section light-receiving surface. The four-section direction corresponds to the disc radius direction and to a track tangential direction. The light-receiving portion 21 has a square light-receiving surface and is divided into four equal sections. The light-receiving portions 22 and 23 have a light-receiving surface that lies longitudinally in the direction of arrangement of the light-receiving portions 22 and 23 (in a track tangential direction). On each of the light-receiving surfaces of the light-receiving portions 22 and 23, a dividing line in a track tangential direction is a line creating two equal sections. However, a dividing line in a disc radius direction is positioned on the light-receiving portions 22 and 23, somewhat further outwards than the line creating two equal sections. As shown in FIG. 5, the light-receiving portion 21 comprises photo-detection elements 21a to 21d for the four sections, the light-receiving portion 22 comprises photo-detection elements 22a to 22d for the four sections, and the light-receiving portion 23 comprises photo-detection elements 23a to 23d for the four sections.

Figure 6A:
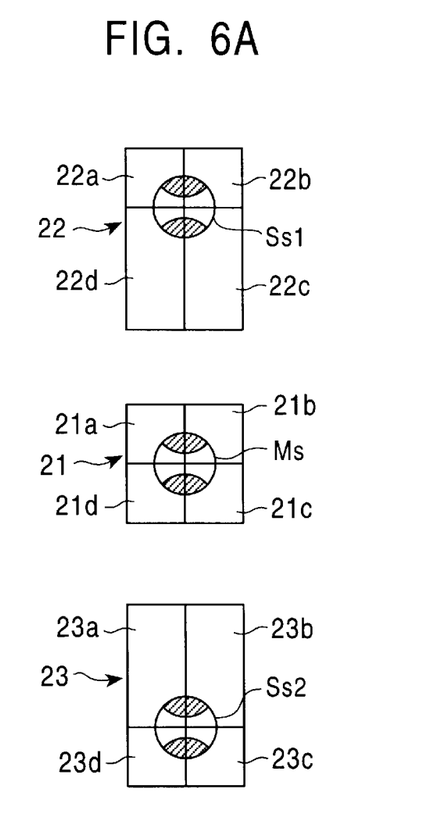
FIGS. 6A and 6B show beam spots formed on the light-receiving surfaces of a photodetector.

When a first laser beam is emitted, circular light spots Ms, Ss1 and Ss2 are formed as shown in FIG. 6A on the light-receiving portions 21 to 23 of the photodetector 20 by the laser beam reflected from the disc 10. FIG. 6A shows a state in which there are not any focusing error and tracking error, that is, a state in which the first laser beam has been tracked correctly, where tracking servo control is performed such that the center of the light spot Ms resulting from the main beam is the divisional center of the light-receiving portion 21, the center of the light spot Ss1 resulting from one sub-beam is the divisional center of the light-receiving portion 22, and the light spot Ss2 resulting from the other sub-beam is the divisional center of the light-receiving portion 23.

Figure 6B:
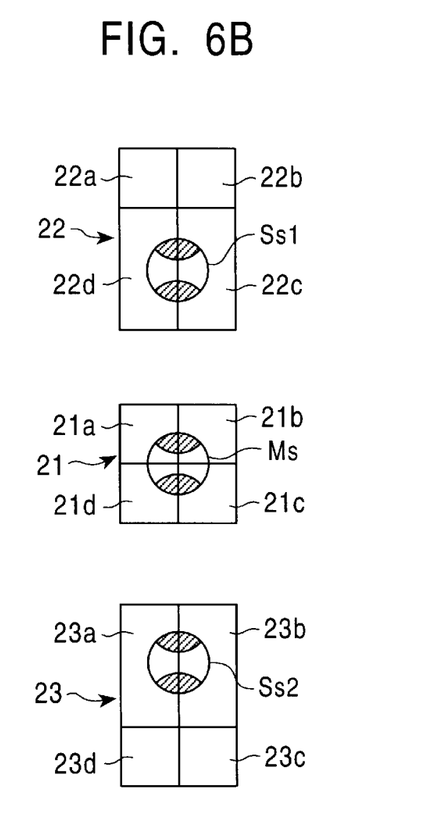

On the other hand, when a second laser beam is emitted, circular light spots Ms, Ss1 and Ss2 are formed as shown in FIG. 6B on the light-receiving portions 21 to 23 of the photodetector 20, by the laser beam reflected from the disc 10. FIG. 6B shows a state in which there is no focusing error or tracking error, that is, a state in which the second laser beam has been tracked correctly, where tracking servo control is performed such that the center of the light spot Ms resulting from the main beam is the divisional center of the light-receiving portion 21, the center of the light spot Ss1 resulting from one sub-beam is further inwards than the divisional center of the light-receiving portion 22, the light spot Ss1 being received by the photo-detection elements 22c and 22d, and the light spot Ss2 resulting from the other sub-beam is further inwards than the divisional center of the light-receiving portion 23, the light spot Ss2 being received by the photo-detection elements 23c and 23d. Further, the shaded portions of the light spots Ms, Ss1 and Ss2 show the intensity distribution of the returning beam, and, on the photodetector 20, the intensity distribution resulting from astigmatism by means of the cylindrical lens 19 is inverted by 90 degrees.

The optical pickup apparatus is constituted as shown in FIG. 5. As shown in the figure, with regard to the output signals from the light-receiving portion 21, the optical pickup apparatus comprises: an adder 25, which adds an output signal 1A of the photo-detection element 21a and an output signal 1B of the photo-detection element 21b; an adder 26, which adds an output signal 1C of the photo-detection element 21c and an output signal 1D of the photo-detection element 21d; a subtracter 27, which outputs a push-pull signal for a main beam by subtracting the output signal of the adder 26 from the output signal of the adder 25; an adder 28, which adds an output signal 1A of the photo-detection element 21a and an output signal 1D of the photo-detection element 21d; an adder 29, which adds an output signal 1B of the photo-detection element 21b and an output signal 1C of the photo-detection element 21c; a subtracter 30, which outputs an astigmatism signal for a main beam (an output signal obtained through the addition and multiplication of each output signal of the four-section light-receiving portion) by subtracting the output signal of the adder 29 from the output signal of the adder 28; and an adder 31, which outputs an RF signal by adding the output signal of the adder 28 and the output signal of the adder 29.

A tracking servo circuit 52 (described hereinbelow) is connected with the output of the subtracter 27, a focusing servo circuit 51 (described hereinbelow) is connected with the output of the subtracter 30, and a playback processing portion (not shown in the figure) is connected with the output of the adder 31.

In addition, with regard to the output signals from the light-receiving portion 22, the optical pickup apparatus comprises: an adder 32, which adds an output signal 2A of the photo-detection element 22a and an output signal 2B of the photo-detection element 22b; an adder 33, which adds an output signal 2C of the photo-detection element 22c and an output signal 2D of the photo-detection element 22d; a subtracter 34, which outputs a push-pull signal for a sub-beam by subtracting the output signal of the adder 33 from the output signal of the adder 32; an adder 35, which adds an output signal 2A of the photo-detection element 22a and an output signal 2D of the photo-detection element 22d; an adder 36, which adds an output signal 2B of the photo-detection element 22b and an output signal 2C of the photo-detection element 22c; and a subtracter 37, which outputs an astigmatism signal for a sub-beam by subtracting the output signal of the adder 36 from the output signal of the adder 35.

A tracking servo circuit 52 (described hereinbelow) is connected with the respective outputs of the adder 33 and the subtracter 34, and a focusing servo circuit 51 (described hereinbelow) is connected with the output of an adder 37.

In addition, with regard to the output signals from the light-receiving portion 23, the optical pickup apparatus comprises: an adder 38, which adds an output signal 3A of the photo-detection element 23a and an output signal 3B of the photo-detection element 23b; an adder 39, which adds an output signal 3C of the photo-detection element 23c and an output signal 3D of the photo-detection element 23d; a subtracter 40, which outputs a push-pull signal for a sub-beam by subtracting the output signal of the adder 39 from the output signal of the adder 38; an adder 41, which adds an output signal 3A of the photo-detection element 23a and an output signal 3D of the photo-detection element 23d; an adder 42, which adds an output signal 3B of the photo-detection element 23b and an output signal 3C of the photo-detection element 23c; and a subtracter 43, which outputs an astigmatism signal for a sub-beam by subtracting the output signal of the adder 42 from the output signal of the adder 41.

A tracking servo circuit 52 (described hereinbelow) is connected with the respective outputs of the adder 38 and the subtracter 40, and a focusing servo circuit 51 (described hereinbelow) is connected with the output of the subtracter 43.

As shown in FIG. 5, the focusing servo circuit 51 comprises: an adder 61, which adds an output signal of the subtracter 37 and the output signal of the subtracter 43; a multiplier 62, which multiplies a coefficient h by the output signal of the adder 61; a switch 63; an adder 64, which generates a focusing error signal FE by adding the output signal of the subtracter 30 and the output signal of the multiplier 62; an equalizer 65, which generates a focusing drive signal FD in accordance with the focusing error signal FE that is the output signal of the adder 64; a switch 66, an adder 67; and a voltage application circuit 68 which generates a variable voltage.

The focusing drive signal FD output from the equalizer 65 is supplied to a drive circuit 69 via the switch 66 and the adder 67 when the switch 66 is ON. The drive circuit 69 drives the focussing section of an actuator 24 in accordance with the focusing drive signal FD. The ON and OFF operation of the switch 63 is controlled by means of a system control circuit (not shown) such that the switch 63 is OFF when a CD-type disc is read, and is ON when a DVD-type disc is read. The switch 66 is also similarly controlled to be ON or OFF by means of a system control circuit (not shown). The voltage application circuit 68 generates a variable voltage in accordance with a focus jump instruction from the system control circuit. When the variable voltage from the voltage application circuit 68 is generated, addition by the adder 67 is performed such that the output signal of the adder 67 is then the focusing drive signal FD.

Also, the focusing error signal FE output from the adder 64 when the switch 63 is OFF is a main beam astigmatism signal which is used when a CD-type disc is read. Also, the focusing error signal FE output from the adder 64 when the switch 63 is ON is produced by multiplying a sub-beam astigmatism signal from the main beam astigmatism signal by a predetermined coefficient and by then adding the signal thus obtained, and by this means, the noise component produced in a main beam astigmatism signal, resulting from track crossing, is canceled.

As shown in FIG. 5, the tracking servo circuit 52 comprises: an adder 71, which adds an output signal of the subtracter 34 and the output signal of the subtracter 40; a multiplier 72, which multiplies a coefficient k by the output signal of the adder 71; a subtracter 73, which produces a tracking error signal TE of the differential push-pull method by subtracting the output signal of the multiplier 72 from the output signal of the subtracter 27 (main beam push-pull signal); a subtracter 74, which produces a tracking error signal of the three beam method by subtracting the output signal of the adder 38 from the output signal of the adder 33; a switch 75, which selects either one of the output signal of the subtracter 73 and the output signal of the subtracter 74; an equalizer 76, which generates a tracking drive signal TD in accordance with a tracking error signal TE that is the output signal of the subtracter 73 or the output signal of the subtracter 74, selected by means of the switch 75; and a switch 77.

The coefficient k of the multiplier 72 is set such that the magnitude of the output signal of the subtracter 31 (main beam push-pull signal) and the magnitude of the output signal of the multiplier 71 (sub-beam push-pull signal) are substantially equal. Also, these output signals are such that when the polarity of the AC component thereof is mutually opposite, the polarity of the DC component of both these output signals is the same.

The switch 75 is controlled by a system control circuit (not shown in the figure) such that, when a CD-type disc is played back, a connection is made to the output element of the subtracter 74 to supply a tracking error signal of the three-beam method to the equalizer 76, and, when a DVD-type disc is played back, a connection is made to the output element of the subtracter 73 to supply a tracking error signal of the differential push-pull method to the equalizer 76.

The equalizer 76 generates a tracking drive signal TD such that there is a reduction in the tracking error signal TE. The tracking drive signal TD output from the equalizer 76 is supplied to the drive circuit 78 via the switch 77 when the switch 77 is ON. The drive circuit 78 drives the tracking section of the actuator 30 in accordance with the tracking drive signal TD. The ON and OFF operation of the switch 77 is controlled by the system control circuit mentioned above.

If the above RF signal, focusing error signal FE and tracking error signal TE are expressed as equations using the output signals 1A to 1D of the photo-detection elements 21a to 21d, the output signals 2A to 2D of the photo-detection elements 22a to 22d, the output signals 3A to 3D of the photo-detection elements 23a to 23d, and the coefficients h and k, these equations are as shown below.

When a DVD-type optical disc is played by means of the first laser beam, the followings are expressed:

$$RF\ signal = 1A+1B+1C+1D \tag{1}$$

$$FE_{DVD} = \{(1A+1D)-(1B+1C)\}+h[\{(2A+3A)+(2D+3D)\}-\{(2B+3B)+(2C+3C)\}] \tag{2}$$

$$TE_{DVD} = \{(1A+1B)-(1C+1D)\}-k[\{(2A+3A)+(2B+3B)\}-\{(2C+3C)+(2D+3D)\}] \tag{3}$$

When a CD-type optical disc is played by means of the second laser beam, the followings are expressed:

$$RF\ signal = 1A+1B+1C+1D \tag{4}$$

$$FE_{CD} = (1A+1D)-(1B+1C) \tag{5}$$

$$TE_{CD} = (2C+2D)-(3A+3B) \tag{6}$$

In the optical pickup apparatus, as shown in FIGS. 6A and 6B, when the second laser beam is emitted, the light spots Ss1 and Ss2 formed on the light-receiving portions 22 and 23 of the photodetector 20 is positioned closer to the light spot Ms than the light spots Ss1 and Ss2 formed on the light-receiving portions 22 and 23 of the photodetector 20 in the case where the first laser beam is emitted.

The intervals g and h between the light spot formed by the main beam and the light spots formed by the sub-beams on the light-receiving surfaces of the photodetector 20, for each of the first laser beam and of the second laser beam, can be sought as per the following equations (7) and (8).

$$g = (0.65\beta_{650} \cdot a)/(I \cdot \alpha_{650}) \tag{7}$$

$$h = (0.78\beta_{780} \cdot b)/(J \cdot \alpha_{780}) \tag{8}$$

Here, the wavelength of the first laser beam is 650 nm, and the wavelength of the second laser beam is 780 nm. Also, the parameters are set as follows.

$\alpha_{650}$: outgoing magnification factor (distance from the semiconductor laser element 11 to the recording surface of the disc 10);

$\alpha_{780}$: outgoing magnification factor (distance from the semiconductor laser element 12 to the recording surface of the disc 10);

$\beta_{650}$: return magnification factor (distance from the recording surface of the disc 10 to the photodetector 20);

$\beta_{780}$: return magnification factor (distance from the recording surface of the disc 10 to the photodetector 20);

a: distance from the semiconductor laser element 11 to the grating surface of the first grating 13;

b: distance from the semiconductor laser element 12 to the grating surface of the second grating 15;

I: grating pitch of the first grating 13;

J: grating pitch of the second grating 15.

Since the intervals g and h between the light spot formed by the main beam and the light spots formed by the sub-beams, for each of the first laser beam and of the second laser beam have the relationship g>h, by using the above equations (7) and (8), $$(0.65\beta_{650} \cdot a)/(I \cdot \alpha_{650}) > (0.78\beta_{780} \cdot b)/(J \cdot \alpha_{780}) \qquad (9)$$

holds. The semiconductor laser elements 11 and 12 are arranged such that the outgoing magnification factors $\alpha_{650}$ and $\alpha_{780}$ are mutually equal, and when the return magnification factors $\beta_{650}$ and $\beta_{780}$ are mutually equal, the above equation (9) becomes as follows:

$$0.83 > (I \cdot b)/(J \cdot a) \qquad (10).$$

In other words, it is preferable if the semiconductor laser elements 11 and 12 and the gratings 13 and 15 are arranged and the grating pitches of the gratings 13 and 15 are set, the equation (10) is satisfied.

It is therefore possible to position the light spots Ss1 and Ss2 formed on the light-receiving portions 22 and 23 of the photodetector 20 in the case where a second laser beam is emitted, to be further inwards than the light spots Ss1 and Ss2 formed on the light-receiving portions 22 and 23 of the photodetector 20 in the case where a first laser beam is emitted. However, by setting this positional relationship, it is possible to suppress a drop in the level of a tracking error signal resulting from decentering of a disc for the reasons provided below.

In a tracking servo control, which produces a tracking error signal from a main beam and a pair of sub-beams as in the three-beam method or the differential push-pull method, a drop in the level of a tracking error signal is produced since, upon decentering of the disc, the relative angle between the three beams and a track is displaced from a prescribed value. The extent of this level drop may substantially be expressed by $\cos(\pi Hd/RP)$ when, in the case of the three-beam method, the time when no drop occurs is assumed to be 1. Further, when, in the case of the differential push-pull method, the time when no drop occurs is similarly assumed to be 1, the extent of this level drop may substantially be expressed by $\cos(\pi Hd/2RP)$. Here, H is the distance between the ±order diffracted lights, d is the decentering amount of the disc, R is the radius of the disc, and P is the track pitch thereof. In other words, in the case of the tracking servo control method, playback of a CD-type optical disc using the three-beam method is more susceptible to the effect of level deterioration, of the tracking error signal, which results from decentering of the disc, than playback of a DVD-type optical disc using the differential push-pull method. Therefore, in the embodiments of the present invention, an optical pickup apparatus is implemented that is capable of reading a great variety of CD-type and DVD-type optical discs by performing setting like that for the above equations (7) to (10) and by making H as small as possible, H being equivalent to the interval between the main beam and the sub-beams of the second laser beam when a CD-type optical disc is read.

Further, in the above embodiment, a description was provided for the case where the first laser beam emitted by the semiconductor laser element 11 has a wavelength of 650 nm, and the second laser beam emitted by the semiconductor laser element 12 has a wavelength of 780 nm. However, the present invention is not limited by or to these wavelengths. Assuming that the wavelength of the first laser beam is $\lambda 1$ and the wavelength of the second laser beam is $\lambda 2$, the above equation (10) can be expressed by:

$$\lambda 1/\lambda 2 > (I \cdot b)/(J \cdot a) \qquad (11)$$

If the semiconductor laser elements 11 and 12 and the gratings 13 and 15 are arranged and the grating pitches of the respective gratings 13 and 15 are set so that the equation (11) can be satisfied, it is possible to position the light spots Ss1 and Ss2 formed on the light-receiving portions 22 and 23 of the photodetector 20 in the case where a second laser beam is emitted, to be further inwards than the light spots Ss1 and Ss2 formed on the light-receiving portions 22 and 23 of the photodetector 20 in the case where a first laser beam is emitted.

Figure 7:
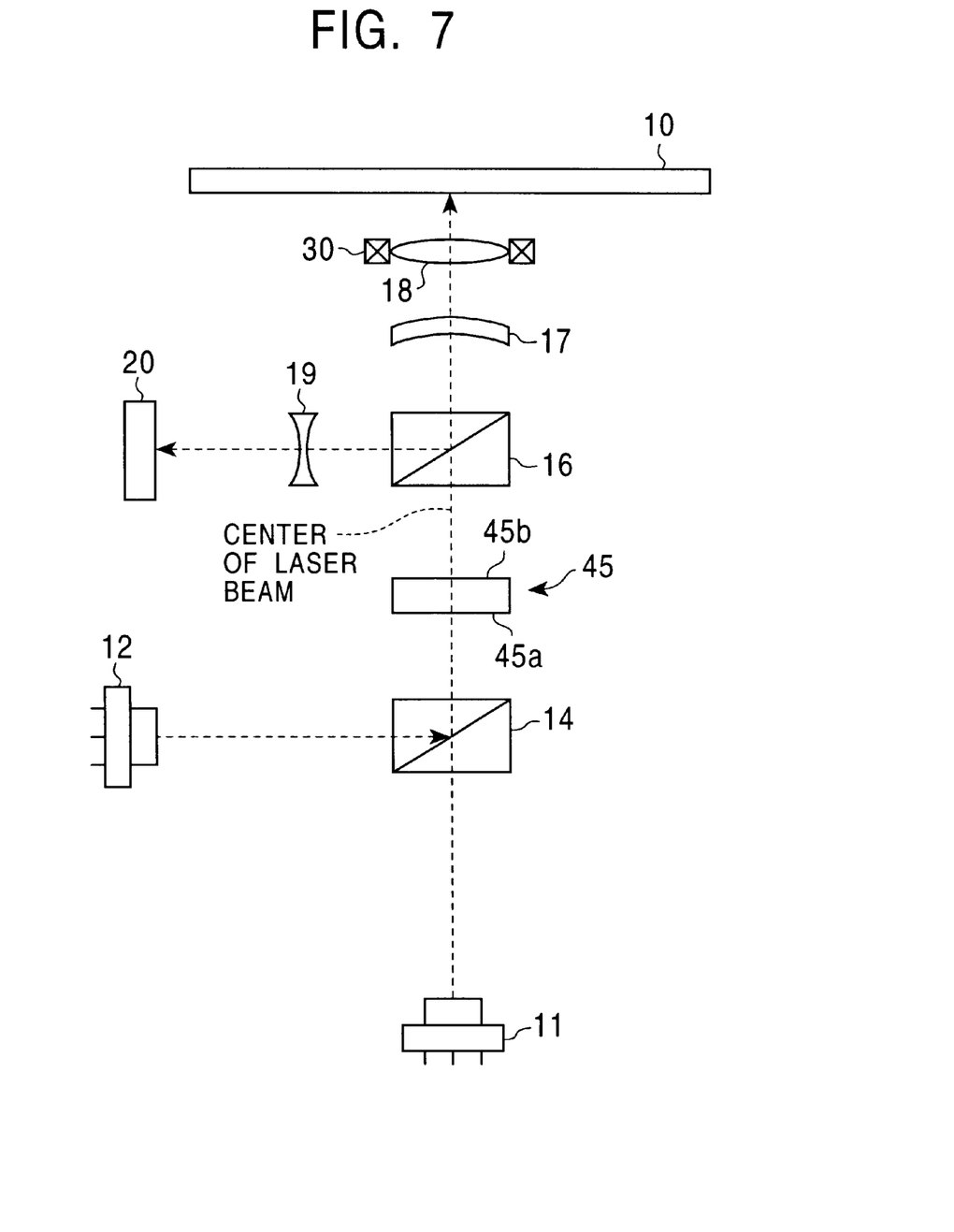
FIG. 7 shows the constitution of an optical system of an optical pickup apparatus, which constitutes another embodiment of the present invention.

In the embodiment described above, two gratings 13 and 15 are arranged. However, as shown in FIG. 7, a double-sided grating 45 may also be provided in place of gratings 13, 15 shown in FIG. 2. In the optical pickup apparatus in FIG. 7, the grating 45 is disposed between an optical path combination prism 14 and a beam splitter 16. The surface 45a of the grating 45, on the optical path combination prism 14 side thereof, is formed having a diffraction grating for a first laser beam, and the surface 45b, on the beam splitter 16 side, is formed having a diffraction grating for a second laser beam. Also in the optical pickup apparatus in FIG. 7, the semiconductor laser elements 11, 12 and the double-sided grating 45 are arranged and the thickness of the double-sided grating 45 is set such that the above equation (10) is satisfied.

Figure 8:
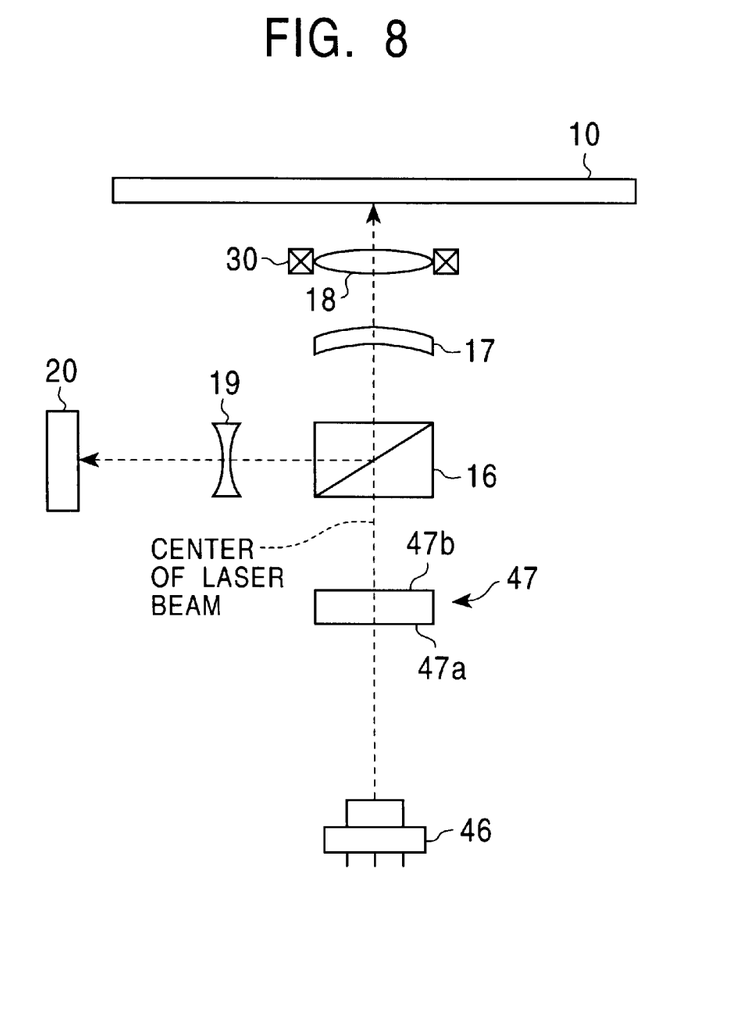
FIG. 8 shows the constitution of an optical system of an optical pickup apparatus, which constitutes another embodiment of the present invention.

Also, in the embodiment described above, two semiconductor laser elements 11, 12 have been provided. However, as shown in FIG. 8, it is also possible to use a dual wavelength semiconductor laser element 46 that emits two laser beams of different wavelength. In the optical pickup apparatus in FIG. 8, in place of the semiconductor laser elements 11, 12, the gratings 13, 15, and the optical path combination prism 14, which are shown in FIG. 2, a dual wavelength semiconductor laser element 46 and a double-sided grating 47 have been provided. The double-sided grating 47 is disposed between the dual wavelength semiconductor laser element 46 and a beam splitter 16. The surface 47a of the grating 47, on the dual wavelength semiconductor laser element 46 side thereof, is formed with a diffraction grating for a first laser beam, and the surface 47b on the beam splitter 16 side, is formed having a diffraction grating for a second laser beam. Also in the optical pickup apparatus in FIG. 8, the dual wavelength semiconductor laser element 46 and the double-sided grating 47 are arranged and the thickness of the double-sided grating 47 is set such that the above equation (10) is satisfied.

Further, the embodiments described above have been described in relation with the case where laser beams are used that have wavelengths of 650 nm and 780 nm. However, the present invention is not limited to or by the case in which these wavelengths are employed.

As described hereinabove, according to the present invention, it is possible to implement an optical pickup apparatus, which reads DVD-type discs including DVD-RAMs by selectively switching two light sources that emit laser beams of different wavelengths, by means of a simple constitution that uses a photodetector for CD-format reading and also DVD-format reading, and which is also capable of performing suitable reading through the adoption of a tracking servo method suited to CD-type discs and DVD-type discs.

This application is based on Japanese Patent Application No. 2001-63621 which is hereby incorporated by reference.

What is claimed is:

1. An optical pickup apparatus, comprising:
   a first light source for emitting a first laser beam having a first wavelength;
   a second light source for emitting a second laser beam having a second wavelength that is longer than the first wavelength of said first laser beam;
   a first grating having a diffraction grating formed with a first predetermined grating pitch, for passing through said first laser beam as a main-beam, and for outputting two sub-beams composed from diffracted lights of said first laser beam;
   a second grating having a diffraction grating formed with a second predetermined grating pitch different from said first predetermined grating pitch, for passing through said second laser beam as a main-beam, and for outputting two sub-beams composed from diffracted lights of said second laser beam; and
   an optical system for guiding the main beam and the two sub-beams to a recording surface of a recording medium, and for guiding the main beam and the sub-beams reflected at the recording surface of said recording medium to a photodetector to form respective spots corresponding to the main-beam and the two sub-beams reflected, on light-receiving surfaces of said photodetector,
   wherein assuming that a distance from said first light source to said first grating is given by a, a distance from said second light source to said second grating is given by b, said first predetermined grating pitch is given by I, said second predetermined grating pitch is given by J, the wavelength of said first laser beam is given by $\lambda 1$, and the wavelength of said second laser beam is given by $\lambda 2$, $$\lambda 1/\lambda 2 > (I \cdot b)/(J \cdot a)$$

is satisfied.

2. An optical pickup apparatus according to claim 1, wherein said photodetector has three four-section light-receiving surfaces on which the respective spots of the main beam and the two sub-beams are formed, and generates output signals in correspondence with the light intensity of each sectioned surface.

3. An optical pickup apparatus according to claim 1, further comprising a tracking error signal generator for generating a tracking error signal with the differential push-pull method in accordance with output signals of said photodetector when said first laser beam is emitted from said first light source, and for generating a tracking error signal with the three-beam method in accordance with output signals of said photodetector when said second laser beam is emitted from said second light source.

4. An optical pickup apparatus according to claim 1, wherein said first grating and second grating are constituted by a single diffraction grating element, a diffraction grating of said first grating is formed at one surface of said diffraction grating element, and a diffraction grating of said second grating is formed at the opposite surface of the one surface of said diffraction grating element.

5. An optical pickup apparatus according to claim 1, wherein said first light source and said second light source are formed as a single element.

* * * * *